United States Patent [19]

Kincheloe

[11] Patent Number: 4,813,706
[45] Date of Patent: Mar. 21, 1989

[54] ROLL CAGE FOR PERSONAL MOTORIZED VEHICLES

[76] Inventor: Dan Kincheloe, P.O. Box 565, Kingston, Okla. 73439

[21] Appl. No.: 94,690

[22] Filed: Sep. 9, 1987

[51] Int. Cl.$^4$ .............................................. B62D 25/06
[52] U.S. Cl. .................................................. 280/756
[58] Field of Search ................................ 280/748, 756

[56] References Cited

U.S. PATENT DOCUMENTS

| | | | |
|---|---|---|---|
| 1,473,956 | 11/1923 | Eyre et al. | 280/756 |
| 2,783,056 | 2/1957 | Belk | 280/756 |
| 2,921,799 | 1/1960 | Hatten | 280/756 |
| 3,561,785 | 2/1971 | Kidder | 280/756 |
| 4,135,591 | 1/1979 | Eberle | 280/756 |
| 4,412,595 | 11/1983 | Kinzel | 280/756 |
| 4,563,023 | 1/1986 | Clarkson | 280/748 |
| 4,673,190 | 6/1987 | Ahlberg | 280/756 |

FOREIGN PATENT DOCUMENTS 622899 6/1927 France ................. 280/756

Primary Examiner—Kenneth R. Rice
Attorney, Agent, or Firm—Blakely, Sokoloff, Taylor & Zafman

[57] ABSTRACT

The present invention provides a protective metal crash cage, or roll cage, for use with ATV's. The roll cage of the present invention utilizes a rounded shape to provide automatic recovery from most "crashes". The cage is designed so that it can be retrofitted to existing ATV's. In addition, a special harness system is employed which acts as a web to support the driver without restricting his ability to control the ATV through movement of his body. The roll cage of the present invention is designed to contain the drive wheels of the ATV within its' boundaries except when the ATV is in an upright and safe position. Otherwise, the drive wheels are removed from contact with the ground in a crash situation so as not to continue propelling the vehicle in an unsafe manner.

13 Claims, 4 Drawing Sheets

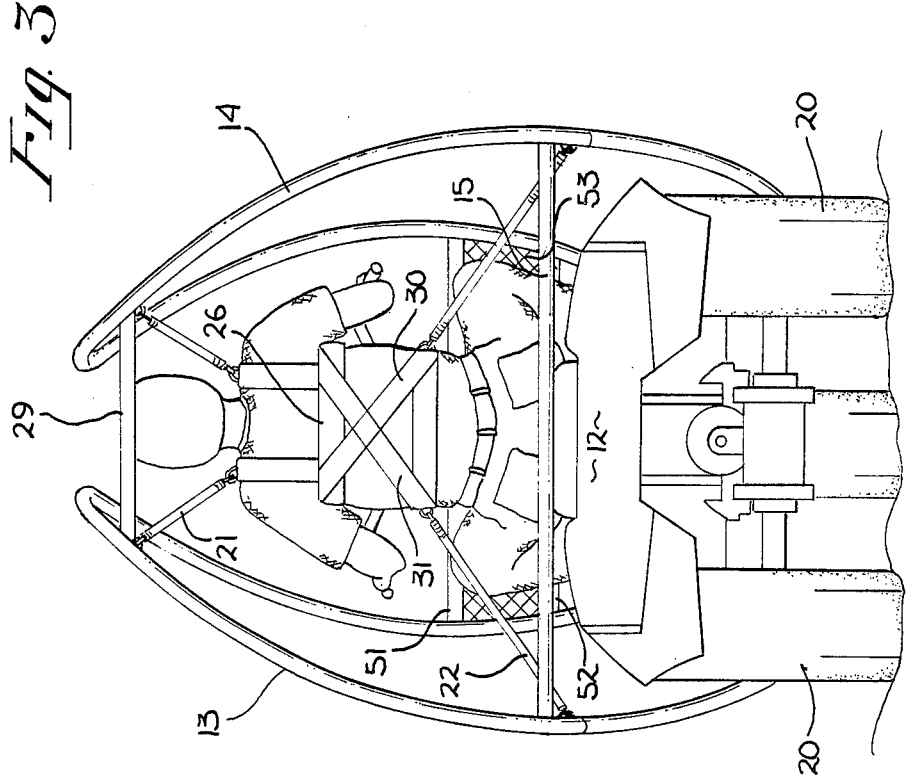
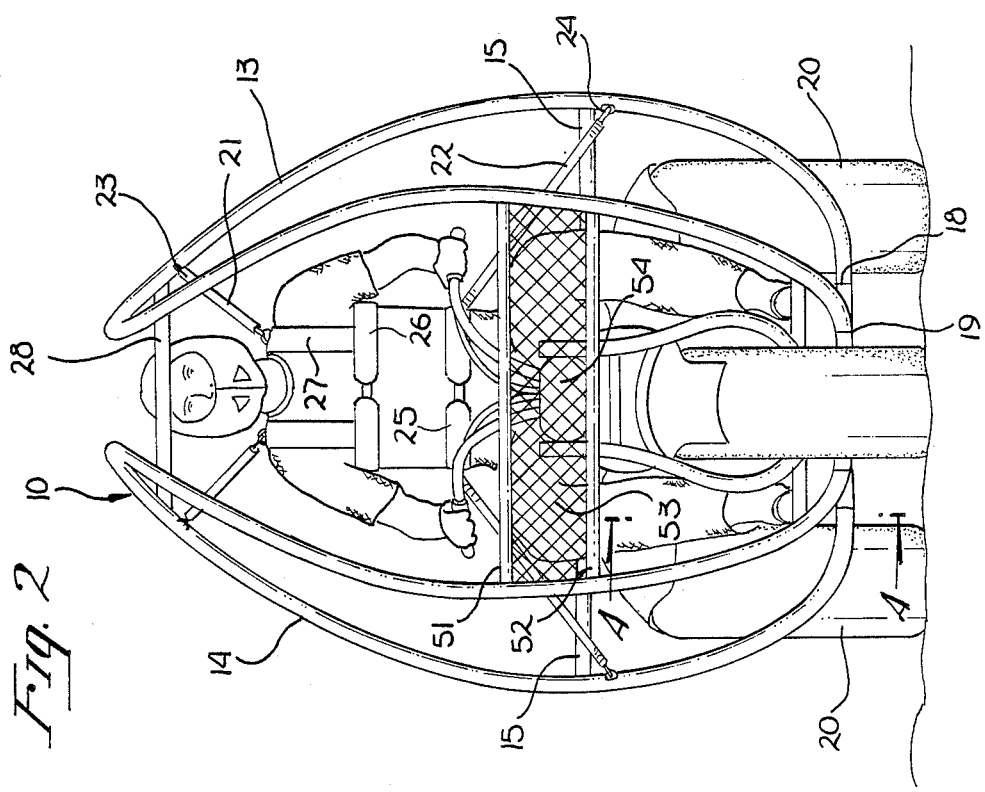

ROLL CAGE FOR PERSONAL MOTORIZED VEHICLES

BACKGROUND OF THE INVENTION

1. FIELD OF THE INVENTION

This invention relates to a field of roll cages for personal motorized vehicles and in particular to roll cages which can be attached to existing all terrain vehicles (ATV's).

2. BACKGROUND ART

ATV's are small motorized vehicles having oversized tires suitable for off road use. Also known as "three wheelers" and "four wheelers", ATV's have enjoyed wide popularity as a recreational vehicle since their introduction. The ruggedness and utility of ATV's permits them to travel rough terrain including very steep and hilly areas. Their very accessibility, though, has resulted in an increased potential for accidents hazardous to the driver of the vehicle. For example, in hill climbing the driver is forced to lean substantially forward on the machine so as to keep the center of gravity such that the ATV will not tip backwards. However, if the center of gravity is not shifted forward, the ATV will tip backward, often landing on the dirver and pinning him to the ground. As ATV's are quite heavy, the potential for injury is very serious.

Prior art attempts at producing a safe off road machine have resulted in "dune buggy" like assemblies in which the entire chassis is essentially one large roll cage. Such vehicles are also known as "baja" buggies. However, these dune buggies and baja buggies do not perform, nor are they intended to perform, the same functions as an ATV. First, such buggies are not equipped to traverse rocky terrain, streams or steep slopes.

Secondly, dune buggies have a low center of gravity such that the driver must sit very low to the ground, restricting his viewing area. The very nature of use of an ATV requires that the driver sit high in the seat so that a comprehensive view of the surrounding terrain is available to avoid potential dangerous situations. In addition, the engine of an ATV is located beneath the driver's seat, adding to the height of the ATV.

Further, dune buggy type assemblies have a seat back so that a shoulder strap or harness may be attached to the seat back itself. On an ATV, no seat back is provided so that no shoulder harness connection is available.

Also, since the roll cage of the dune buggy is unitary with the chassis itself, it is not "retrofittable". Therefore, the dune buggy provides no protection for existing vehicles locking a roll cage. Finally, the roll cages of dune buggies are designed so that the drive wheels remain outside of the roll cage. In an accident, the wheels will tend to continue spinning, causing additional damage and propelling the vehicle in an uncontrolled and dangerous manner.

Therefore, it is an object of the present invention to provide a roll cage for ATV's which is retrofittable to existing ATV's.

It is a further object of the present invention to provide a roll cage for ATV's which allows adequate visibility for a driver.

It is still another object of the present invention to provide a roll cage for ATV's having a means for harnessing a driver in a secure manner.

It is yet another object of the present invention to provide a roll cage for ATV's which permits the drive wheels to contact the ground only when the ATV is in an upright "safe" position.

Other objects and features of the present invention will be made obvious from the following description.

SUMMARY OF THE PRESENT INVENTION

The present invention provides a protective metal crash cage, or roll cage, for use with personal motorized vehicles, including ATV's. The roll cage of the present invention utilizes a rounded shape to provide automatic recovery from most "crashes". The cage is designed so that it can be retrofitted to existing ATV's. In addition, a special harness system is employed which acts as a web to support the driver without restricting his ability to control the ATV through movement of his body. The roll cage of the present invention is designed to contain the drive wheels of the ATV within its'boundaries except when the ATV is in an upright and safe position. Otherwise, the drive wheels are removed from contact with the ground in a crash situation so as not to continue propelling the vehicle in an unsafe manner.

BRIEF DESCRIPTION OF THE DRAWINGS

FIG. 2 is a front view of the invention as shown in FIG. 1.

FIG. 3 is a back view of the embodiment of FIG. 1.

DETAILED DESCRIPTION OF THE PRESENT INVENTION

Figure 1:
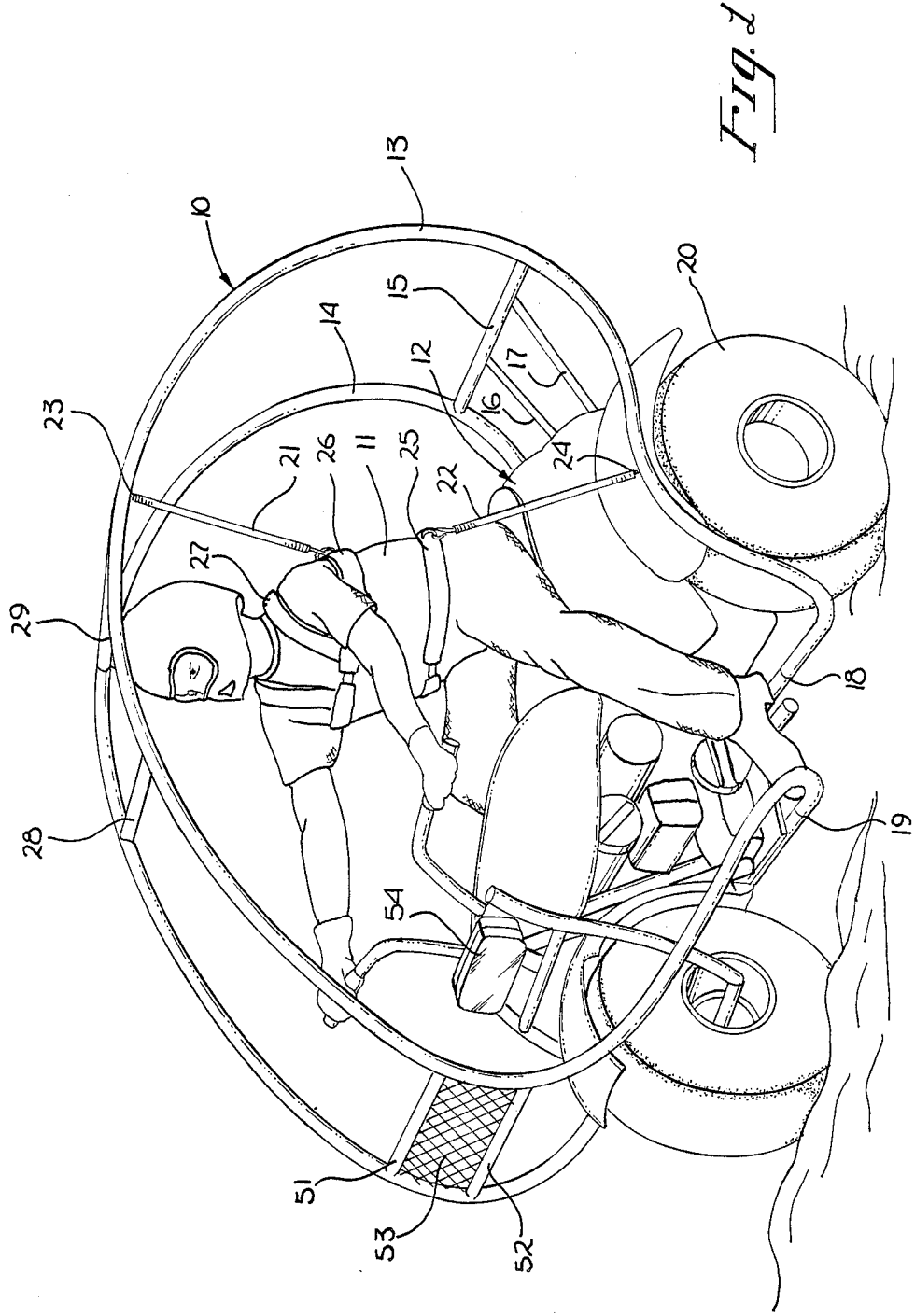
FIG. 1 is a properspective view of the preferred embodiment of the present invention as attached to an ATV.

The preferred embodiment of the present invention is illustrated in FIG. 1. The preferred embodiment comprises a roll cage 10 coupled to a three wheel ATV 12. The shape of the cage 10 is defined by two side rail members 13 and 14. Side rail member 13 is a large loop coupled to one side of the ATV at locations 19 and 18 near the foot of the driver 11. Side rail member 14 is similarly coupled to ATV 12 on the other side of the ATV (unseen). The side rail members 13 and 14 are coupled together with cross members 15, 28 and 29. These members, in the preferred embodiment, are welded to side rail members 13 and 14 and provide rigidity to the roll cage 10. Support members 16 and 17 are coupled substantially orthagonally to cross member 15 to provide a luggage rack area of the roll cage 10.

In order to restrain the driver 11 within the roll cage 10 during an accident, a harness system is provided. The harness system in the preferred embodiment, comprises elastic straps 21 and 22 coupled to side rail 13 at mounting locations 23 and 24 respectably. Similarly disposed elastic members (not shown in FIG. 1) are coupled to side rail number 14. Elastic member 22 is coupled to a belt 25 which circles the waist of the driver 11. Belt 25 functions as a "seat belt" to aid in restraining the driver in place. A shoulder harness is provided by coupling elastic member 21 to belt 26 which encircles the chest of the driver 11. Shoulder harness 27 is coupled to belt 26 to aid in restraining driver 11.

As can be seen from FIG. 1, the roll cage 10 is substantially elliptical in shape. This unique shape aids in accident recovery during two of the most typical ATV accidents, namely, pitching the machine backward when accelerating up a steep hill, or pitching the machine forward when striking an object while heading downhill. Because the roll cage 10 is rounded, the ATV may complete a complete flip in either direction, landing on its' wheels. If a complete flip is not achieved, it may be possible to "rock" the ATV so that is regains its "footing", that is lands on its wheels.

A front view of the roll cage 10 is illustrated in FIG. 2. The side rail members 13 and 14 of the roll cage 10 are curved in a convex manner such that the rails 13 and 14 are closer together near the driver's head than at his wrist. Thus, if the ATV is tipped transversely, it again may be "rocked" back into an upright position by the driver without having to get off the vehicle or out of the protective roll cage. Further, since the roll cage side rails 13 and 14 extend beyond the width of the ATV, the driver 11 does not strike the ground when the vehicle tips transversely. He remains safe and protected within the roll cage 10 where he can continue to act to prevent possible further injury and to correct the attitude of the ATV.

Still referring to FIG. 2, the lower portions of side rails 13 and 14 extend beyond the width of the drive wheels 20. Thus, if the ATV is tipped transversely, the drive wheels will lose contact with the ground so that the ATV remains stationary. This prevents possible dangerous injury of dragging a driver along rough terrain and allows the driver to concentrate on righting himself instead of controlling the direction of the vehicle from a dangerous and unsafe position. Further, the shape of the roll cage prevents portions of the ATV other than the wheels from touching the ground. This prevents damage to sensitive areas of the ATV, increasing its' life and functionability.

Cross member 28 is disposed between side rails 13 and 14 such that it lies substantially in front of the head of the driver 11. As can be seen in FIG. 2, side rails 13 and 14 define a large opening substantially in front of the driver 11. This large opening allows ease of visibility for the driver 11. However, this opening creates a "window" through which low hanging obstacles, such as trees, brush, etc. can enter the roll cage and strike the driver. The window of the roll cage of the present invention is obviously smaller than that of an open ATV (without a roll cage) so increased protection is provided. For additional protection cross member 28 is provided. The cross member 28 helps prevent injuries to the driver 11 by deflecting objects which may otherwise pass through the opening formed by side rails 13 and 14. The cross member 28 also deflects low hanging branches and trees from striking the face of the driver 11 during normal operation of the ATV.

The harness system is designed so that the driver 11 is restrained and protected within the roll cage 10 without affecting movement of his body. By utilizing elastic cords for coupling the harness to the roll cage itself, the driver may still lean left or right, forward or backward to aid in controlling the attitude of the ATV. Particularly during turns, it is important for a driver to lean in the correct direction to prevent tipping of the ATV. Further, because the side rails 13 and 14 are curved so as to extend beyond the boundaries of the ATV itself, the driver 11 may lean substantially in either of the left or right directions withut exiting the protective confines of the roll cage 10.

Referring now to FIG. 3, chest belt 26 is coupled to waist belt 25 by means of cross over straps 30 and 31. Thus, although substantially a unitary harness, the present invention provides 4 point restraint to a driver 11. If desired, the chest belt 26 and waist belt 25 may include buckles for quick release. Alternatively, the elastic members may be decoupled from the harness itself to allow exit of the driver. The roll cage of the present invention may be used without the harness if desired. Alternatively, a second harness may be provided for passengers.

Figure 4:
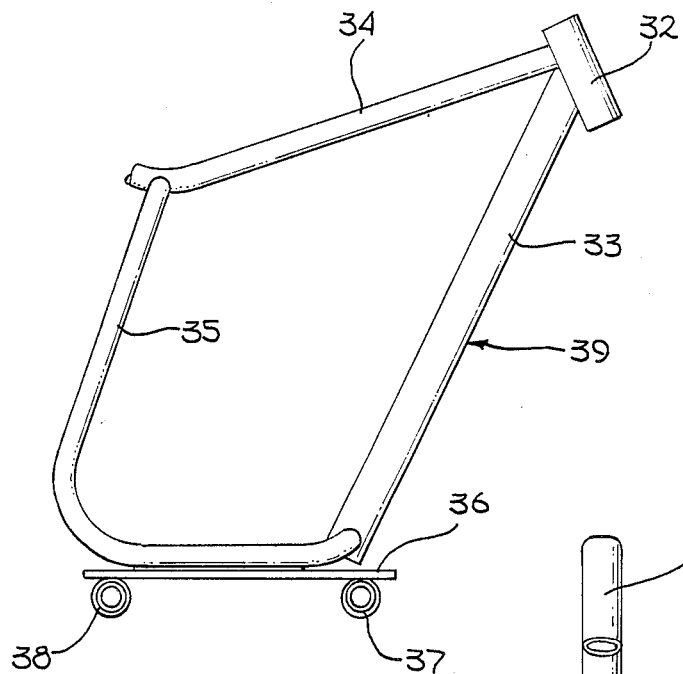
FIG. 4 is a side view of a frame section of the ATV taken along section lines 4–4 of FIG. 1.
Figure 5:
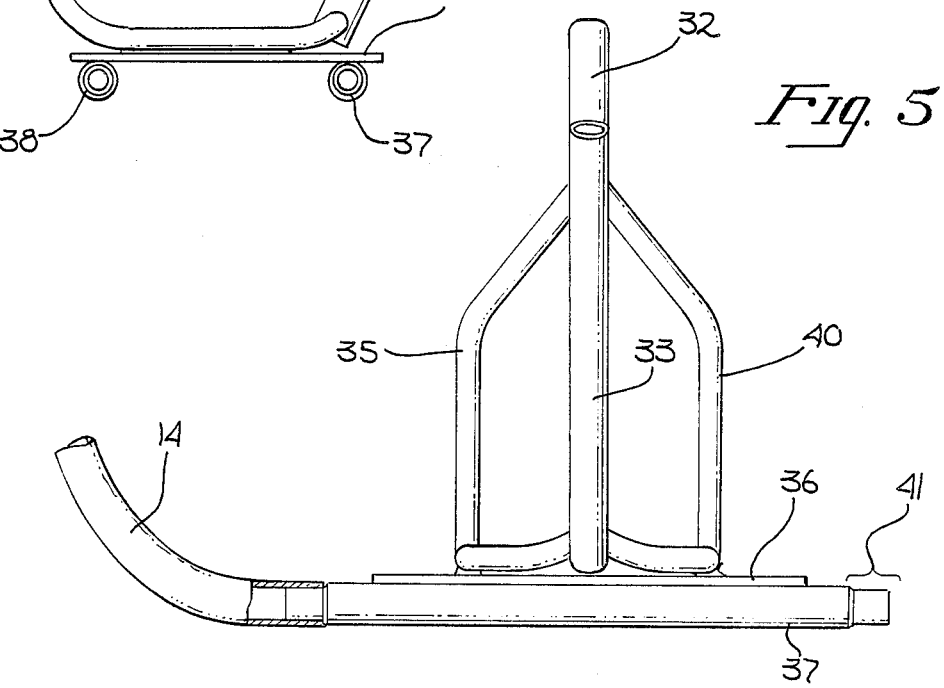
FIG. 5 is a front view of the frame section of FIG. 4.

As noted previously, the present invention may be retrofitted to existing ATV's. A portion of a frame of the ATV of FIGS. 1, 2, 3 as illustrated in FIGS. 4 and 5. FIG. 4 is a cross sectional view of a portion of the ATV frame taken along section line 4—4 of FIG. 2. The ATV frame 39 supports the engine of the ATV and used in the example shown is for mounting of handle bars. The frame 39 includes a front member 33 on which is mounted a collar 32 for mounting of the handle bar steering assembly. A second elongated number 34 extends back and away from collar 32. Side frame members 35 and 40 (see FIG. 5) are coupled to elongated member 34 and to elongated member 33. Lower platform 36 is coupled to side members 35 and 40, typically by welding. Platform 36 forms a mounting plate and support for an engine of the ATV.

In order to facilitate mounting of the roll cage 10 of the present invention, mounting members 37 and 38 are welded on to the bottom of plate 36. Mounting members 37 and 38 are elongated metal tubes with a fitting on either end there of. The fittings are male type fittings which are of smaller diameter than the remainder of the tube area. The mounting members should be placed so as not to interfere with any shift levers of the ATV. Referring to FIG. 5, fitting 41 of mounting number 37 is shown. Side rail member 14 is shown coupled to one end of mounting member 37. In the preferred embodiment, the inner diameter of side rail 14 is slightly larger than the outer diameter of fitting 41 of mounting member 37. Alternatively, the fittings may be of a female type to surround the ends of side rail members 13 and 14.

Figure 6:
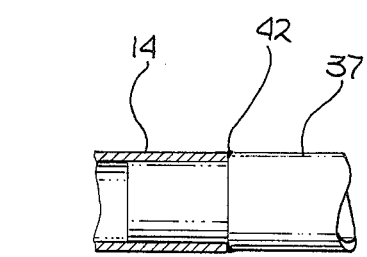
FIG. 6 is an enlarged cut away view of a fitting member of the present invention.
Figure 7:
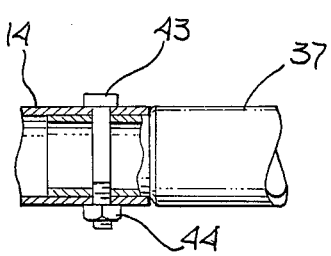
FIG. 7 is an enlarged cross sectional view of an alternate embodiment of the fitting member of the present invention.

FIG. 6 and 7 show two methods of coupling the roll cage 10 to the mounting members 37 and 38 of the present invention. Referring first to FIG. 6, the side rail member 14 is slidably mounted on fitting 41. The end of side rail member 14 abuts the remainder of mounting member 37 at location 42, where the diameter of mounting number 37 increases. Side rail member 14 may be permanently coupled to mounting number 37 by welding at location 42.

Alternatively, side rail member 14 may be removably coupled to mounting member 37. An opening is formed in fitting 41 and side rail member 14 so that a bolt 43 can be extended through the openings when side rail 14 is mounted on fitting 41. The bolt 43 extends through side rail 14 and is held in place with a nut 44

Although the above mounting method has been discussed with respect to side rail member 14 and mounting member 37, it has equal application to side rail member 13 and mounting member 38. Further, any suitable means of attaching side rail members to the mounting members may be employed without departing from the scope of the present invention.

Figure 8:
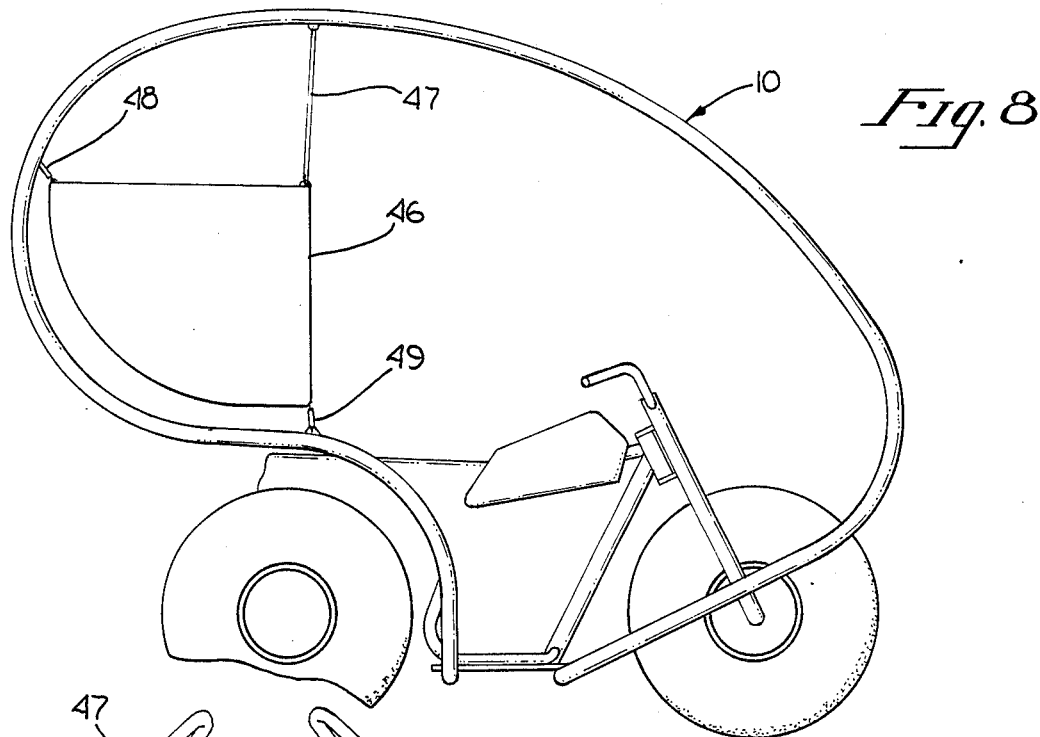
FIG. 8 is a side view of the present invention illustrating a harness system.
Figure 9:
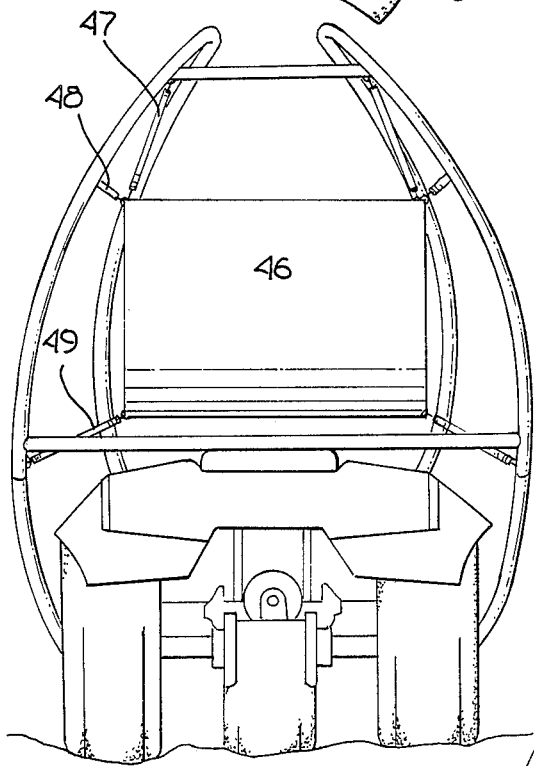
FIG. 9 is a rear view of the embodiment of FIG. 8.

An alternate embodiment of the present invention is illustrated in FIGS. 8 and 9. A cargo pack 46 is mounted in the rear of the roll cage 10 and suspended within the frame. The cargo pack 46 is coupled to the roll cage 10 with elastic cords 47, 48 and 49 respectably. Cargo pack 46 may be of flexible material such as cloth (e.g. nylon) and may include pockets or webbing to securely retain stored items within.

Figure 10:
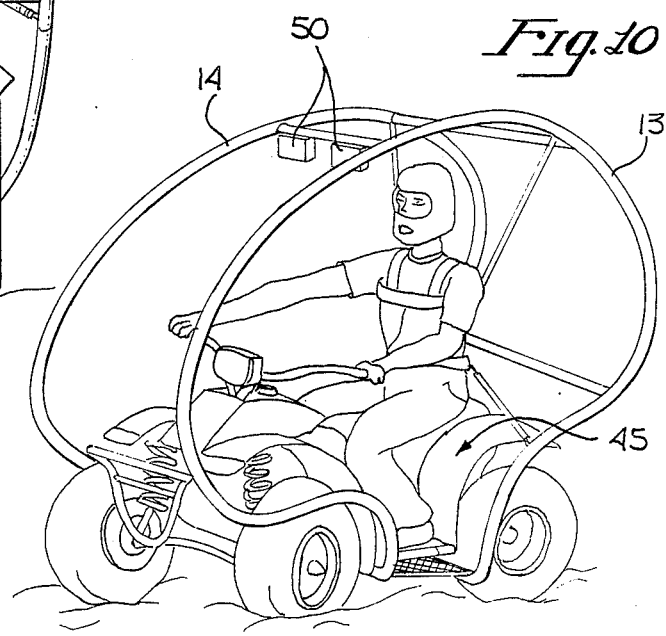
FIG. 10 is a prospective view illustrating an alternate embodiment of the present invention as used with a 4 wheeled ATV.

Referring now to FIG. 10, the roll cage 10 of the present invention has equal application to four wheeled ATV's as shown. The mounting of the roll cage 10 on a four wheeled ATV is identical to that of a three-wheeled ATV. The side rail members 30, 13 and 14 of roll cage 10 are mounted such that they extend beyond the front 2 wheels of a four wheeled ATV so that the wheels do not contact the ground during a crash situation. If desired, head lights or fog lights 50 may be mounted on cross member 28 in any embodiment of the roll cage 10 of the present invention.

An optional feature of the present invention is a head lamp guard illustrated in FIGS. 1 and 2. A pair of cross bar members 51 and 52 are coupled to side rail members 13 and 14 approximately one foot apart and disposed near the front end of the ATV. Wire mesh 53 is coupled to cross bars 51 and 52 to form a protective screen in front of headlight 54 (see FIG. 2). The protective screen prevents branches and other foreign objects from damaging headlight 54 by preventing contact with the headlight. Because wire mesh is used, there is no loss of effectiveness of the headlight in night time use. In addition, visability of the driver is maintained because of the see-through nature of the wire mesh 53. The screen has equal application when the present invention is used with four wheelers and other personalized motor vehicles such as snowmobiles.

The roll cage is comprised of metal in the preferred embodiment but may be of any material of adequate strength, such as hard plastic. Although the present invention has been described with respect to ATV's, it has equal application to all personal motorized vehicles, such as snowmobiles, etc. The roll cage, for best effectiveness, should be disposed outside the drive means of the vehicle (wheels on ATV's, treads on snow mobiles, etc).

Thus, a retrofittable roll cage for ATV's has been described.

I claim:

1. A roll cage for a personal motorized vehicle having a frame and drive means, said roll cage comprising:
    a first mounting member having first and second ends coupled to said frame of said vehicle;
    a second mounting member having third and fourth ends coupled to said frame;
    a first side rail member removably coupled to said first end of said first mounting member and said third and of said second mounting member;
    a second side rail member removably coupled to said second end of said first mounting member and said fourth and of said second mounting member;
    said first and second side rail members extending above said vehicle so as to be substantially convex when viewed from a front and rear of said vehicle and substantially elliptical when viewed from a side of said vehicle;
    a plurality of cross mounting members coupled to said first and second side rail members;
    whereby a removably coupled roll cage is provided.

2. The roll cage of claim 1 further including a harness coupled to said first and second side rail members, said harness for restraining and supporting a driver of said vehicle.

3. The roll cage of claim 2 wherein said harness is coupled to said first and second side rail members with a plurality of elastic members.

4. The roll cage of claim 1 wherein said first and second mounting members are coupled to said frame in front of said drive means of said vehicle.

5. The roll cage of claim 4 wherein said first and second side rail members are disposed such that said drive means is substantially between said first and second side rail members.

6. The roll cage of claim 1 wherein first and second of said plurality of cross mounting members are disposed near a front of said vehicle and further include screening means disposed between said first and second members for providing a protective screen.

7. A roll cage for an all terrain vehicle (ATV) having a frame, front and rear wheels, said roll cage comprising:
    a first mounting member having first and second ends coupled to said frame of said ATV;
    a second mounting member having third and fourth ends coupled to said frame:
    said first and second mounting members disposed substantially between said front and rear wheels of said ATV;
    a first side rail member coupled to said first end of said first mounting member and said third end of said second mounting member;
    a second side rail member coupled to said second end of said first mounting member and said fourth end of said second mounting member;
    first, second and third cross members coupled to said first and second side rails;
    first and second elastic cords coupled to said first side rail member;
    third and fourth elastic cords coupled to said second side rail members;
    harness means coupled to said first, second, third and fourth elastic cords, said harness means for restraining and supporting a driver in said ATV;
    said first and second side rail members being disposed so as to be convex when viewed from a front and rear of said ATV and substantially elliptical when viewed from a side of said ATV.

8. The roll case of claim 7 wherein said first side rail is welded to said first and second mounting members.

9. The roll cage of claim 7 wherein said first side rail member is removably coupled to said first and second mounting members by bolts extending through said first side rail means and through said first and second mounting members.

10. The roll cage of claim 7 further including lighting means coupled to said first cross member.

11. The roll cage of claim 7 wherein said front and rear wheels are disposed substantially between said first and second side rail members.

12. The roll cage of claim 7 further including fourth and fifth cross members coupled to said first and second side rails near said front wheel and screening means disposed between said fourth and fifth cross members.

13. The roll cage of claim 7 further including storage means coupled to and disposed between said first and second side rail members, said storage means comprising a pocket formed of flexible material.

* * * * *

UNITED STATES PATENT AND TRADEMARK OFFICE
CERTIFICATE OF CORRECTION

PATENT NO. : 4,813,706
DATED : March 21, 1989
INVENTOR(S) : Kincheloe

It is certified that error appears in the above-identified patent and that said Letters Patent is hereby corrected as shown below:

| COLUMN | LINE | |
|---|---|---|
| 01 | 25 | delete "dirver" insert --driver-- |
| 02 | 26 | delete "properspective" insert --prospective-- |
| 03 | 24 | delete "wrist" insert --waist-- |
| 04 | 68 | delete "44" insert --44,-- |
| 06 | 49 | delete "case" insert --cage-- |
| 01 | 54 | delete "locking" insert --lacking-- |

Signed and Sealed this

Twelfth Day of December, 1989

Attest:

JEFFREY M. SAMUELS

*Attesting Officer*       *Acting Commissioner of Patents and Trademarks*